United States Patent
Brandner et al.

(10) Patent No.: US 7,704,440 B2
(45) Date of Patent: Apr. 27, 2010

(54) FUEL SYSTEM COMPONENT AND METHOD OF MANUFACTURE

(75) Inventors: Brian W. Brandner, Kingsville (CA); Vladimir Franjo, Windsor (CA); Keith D. Kersey, Windsor (CA); Harald Knueppel, Belle River (CA); Ted J. Latouf, Windsor (CA); James R. Osborne, Davisburg, MI (US)

(73) Assignee: TI Group Automotive Systems, L.L.C., Warren, MI (US)

( * ) Notice: Subject to any disclaimer, the term of this patent is extended or adjusted under 35 U.S.C. 154(b) by 490 days.

(21) Appl. No.: 10/999,455

(22) Filed: Nov. 30, 2004

(65) Prior Publication Data

US 2005/0115054 A1 Jun. 2, 2005

Related U.S. Application Data

(63) Continuation-in-part of application No. 10/726,182, filed on Dec. 2, 2003, now Pat. No. 7,565,986.

(51) Int. Cl.
*B29C 49/04* (2006.01)
*B29C 49/30* (2006.01)
*B29C 49/50* (2006.01)

(52) U.S. Cl. .................. 264/515; 264/510; 264/531; 264/533; 264/534

(58) Field of Classification Search .............. 264/515, 264/531, 534, 527
See application file for complete search history.

(56) References Cited

U.S. PATENT DOCUMENTS

| | | | |
|---|---|---|---|
| 5,202,078 A * | 4/1993 | Moore | 264/527 |
| 5,951,059 A | 9/1999 | Kitamura | |
| 6,177,162 B1 | 1/2001 | Siour et al. | |
| 6,305,568 B1 | 10/2001 | Suzuki et al. | |
| 6,467,643 B1 | 10/2002 | Sadr | |
| 6,652,699 B1 * | 11/2003 | Sadr | 156/244.11 |
| 6,702,974 B2 * | 3/2004 | Brandner et al. | 264/254 |
| 6,715,626 B2 * | 4/2004 | Balzer et al. | 220/4.14 |
| 6,811,739 B2 * | 11/2004 | Sadr | 264/515 |
| 6,843,267 B1 | 1/2005 | Van Schaftingen et al. | |
| 6,860,398 B2 * | 3/2005 | Potter et al. | 220/567.2 |

(Continued)

FOREIGN PATENT DOCUMENTS

JP 63-242723 10/1988

(Continued)

*Primary Examiner*—Monica A Huson
(74) *Attorney, Agent, or Firm*—Reising Ethington P.C.

(57) ABSTRACT

A fuel tank that is substantially impermeable to fuel vapor has a shell with an interior for holding fuel, an opening for receiving fuel into the interior, and a fill nipple with a barrier layer. The fill nipple has an outer surface and an inner surface defining a passage extending between a pair of generally opposed ends of the fill nipple. One of the ends is attached to the shell such that the passage is aligned with the opening to allow fuel to flow through the passage and into the interior of the fuel tank. The fill nipple has an inner layer of material forming the inner surface, and an outer layer of material forming the outer surface, and has at least one intermediate layer of material forming the barrier layer. The intermediate layer is formed from a material that is different in composition from the inner and outer layers.

15 Claims, 4 Drawing Sheets

U.S. PATENT DOCUMENTS

| | | |
|---|---|---|
| 6,915,812 B2 | 7/2005 | Frohwein |
| 2002/0011490 A1 | 1/2002 | Nakamura et al. |
| 2002/0063129 A1 | 5/2002 | Potter et al. |
| 2003/0124281 A1 | 7/2003 | Ries et al. |
| 2004/0074904 A1 | 4/2004 | Share et al. |
| 2004/0124567 A1 | 7/2004 | Stangier |
| 2005/0067415 A1 | 3/2005 | Gerard et al. |
| 2005/0211298 A1 | 9/2005 | Frohwein |

FOREIGN PATENT DOCUMENTS

| | | |
|---|---|---|
| JP | 63-242723 A * | 10/1988 |

* cited by examiner

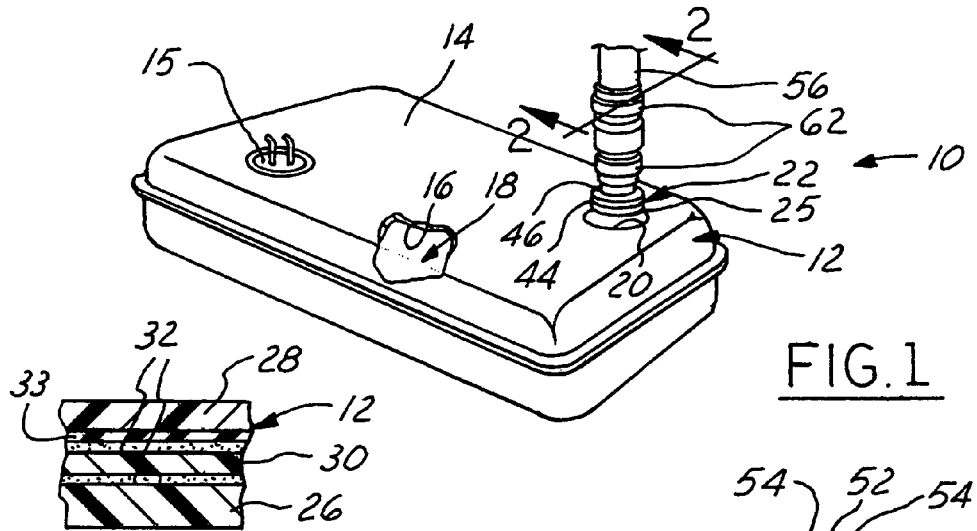
FIG. 1
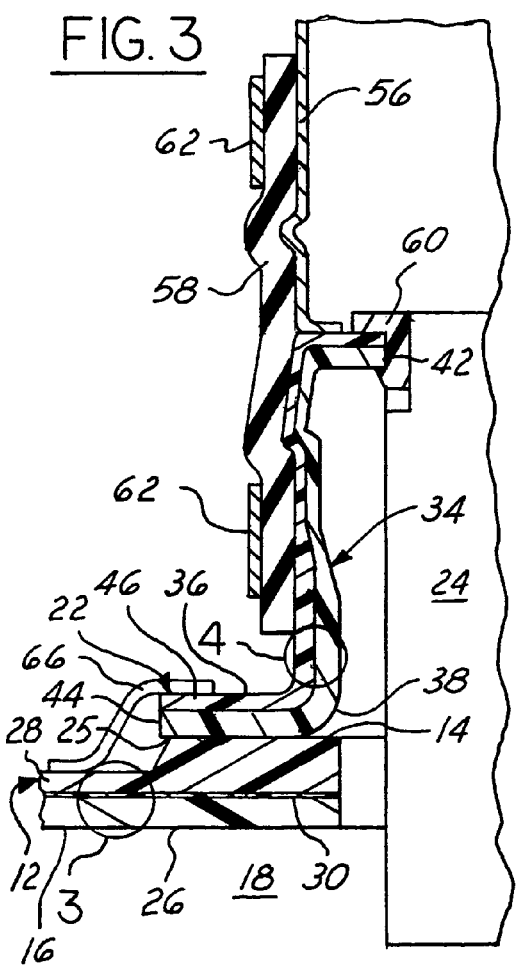
FIG. 2
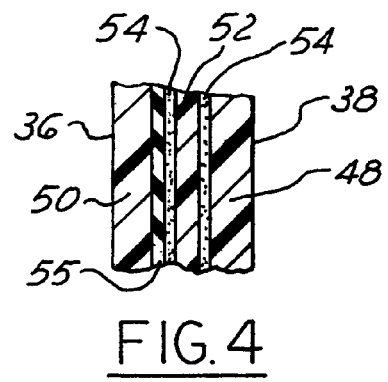
FIG. 3
FIG. 4
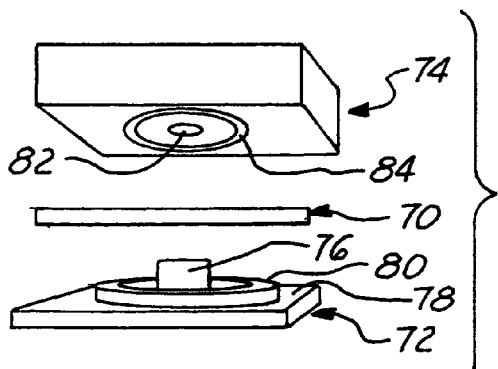
FIG. 5

FUEL SYSTEM COMPONENT AND METHOD OF MANUFACTURE

REFERENCE TO CO-PENDING APPLICATION

This application is a continuation-in-part of U.S. patent application Ser. No. 10/726,182, filed on Dec. 2, 2003, now U.S. Pat. No. 7,565,986.

FIELD OF THE INVENTION

This invention relates generally to fuel systems, and more particularly to a fuel system component and a method of making it.

BACKGROUND OF THE INVENTION

It is known to blow mold fuel tanks from co-extruded six layer parisons that include inner and outer layers of HDPE, a vapor barrier layer sandwiched between a pair of adhesive layers, and a layer of regrind material between one of the adhesive layers and the outer layer. Wherever the vapor barrier layer is interrupted there is a potential path through which hydrocarbons can more easily escape to the atmosphere from the fuel tank. The vapor barrier layer may be interrupted in, for example, the area of openings through the fuel tank wall and in the area of the pinch or seam formed when the parison is closed for molding.

One opening in the fuel tank is provided to receive fuel into the fuel tank through a fill pipe that is attached to the tank via a fill nipple at one end, and receives a refueling nozzle of a refueling or gas station pump at its other end. Conventional fill nipples where made of monolayer HDPE that easily bonded to the fuel tank, but were not highly effective at reducing or inhibiting hydrocarbon permeation to the atmosphere.

In order to meet increasingly strict emission standards, largely promulgated by governmental agencies, it is desirable to form fuel tank and system components that contact liquid fuel or fuel vapor to limit fuel vapor emissions to the atmosphere.

SUMMARY OF THE INVENTION

A fuel tank that is substantially impermeable to fuel vapor has a shell with an interior for holding fuel, an opening for receiving fuel into the interior, and a fill nipple in communication with the opening and having a fuel vapor barrier layer. The fill nipple defines a passage and is attached to the shell so that the passage is aligned with the opening to allow fuel to flow through the fill nipple and into the interior of the fuel tank. The fill nipple has an inner layer of material forming the inner surface, and an outer layer of material forming the outer surface, and has at least one intermediate layer of material forming the barrier layer. The intermediate layer is formed from a material that is different in composition from the inner and outer layers and preferably resists permeation of hydrocarbons therethrough.

In one presently preferred embodiment, the fill nipple has six layers including the inner and outer layers, a vapor barrier layer disposed between two adhesive layers, and a layer of regrind material between the outer layer and one of the adhesive layers. The fill nipple is preferably thermoformed by various methods, including at least vacuum, blow or compression molding or extruded multi-layer sheets or parisons.

Some objects, features and advantages of the present invention include providing a construction for fuel tanks having a fill nipple with a substantially vapor impermeable passage between the fuel tank and a fill pipe, providing a fill nipple that can be readily attached to the shell of the fuel tank, providing a fill nipple that resists delamination, providing a high strength joint between the fill nipple and the shell of the fuel tank, providing a relatively easy and economical manufacture for the construction of the fill nipple, and providing a construction that is adaptable for various sizes and shapes of fill nipples for different fuel tanks.

It should be recognized that the above list represents only some of the objects, features and advantages of the present invention, and that those skilled in the art will recognize other objects, features and advantages upon review of this disclosure in its entirety. Also, a fill nipple falling within the spirit and scope of the appended claims may achieve none, some or all of the listed advantages.

BRIEF DESCRIPTION OF THE DRAWINGS

These and other objects, features and advantages of this invention will be apparent from the following detailed description of the preferred embodiments and best mode, appended claims and accompanying drawings in which:

FIG. 1 is a perspective view of a fuel tank having a fill nipple of one presently preferred embodiment of the invention;

FIG. 2 is a cross-sectional view taken generally along line 2-2 of FIG. 1;

FIG. 3 is an enlarged view of the encircled area number 3 of FIG. 2;

FIG. 4 is an enlarged view of the encircled area number 4 of FIG. 2;

FIG. 5 is a perspective view illustrating mold halves used to vacuum form a multi-layer parison to form a fill nipple;

DETAILED DESCRIPTION OF THE PREFERRED EMBODIMENTS

Figure 6:
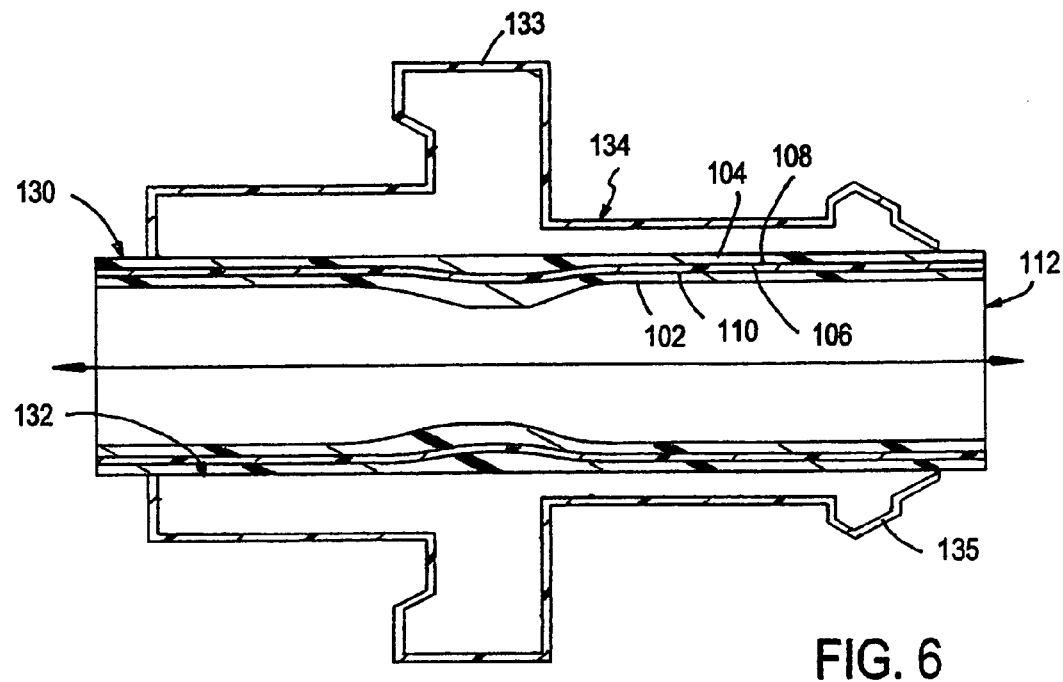
FIG. 6 is a sectional view illustrating a parison received in a mold to form a fill nipple according to another presently preferred embodiment of the invention.
Figure 7:
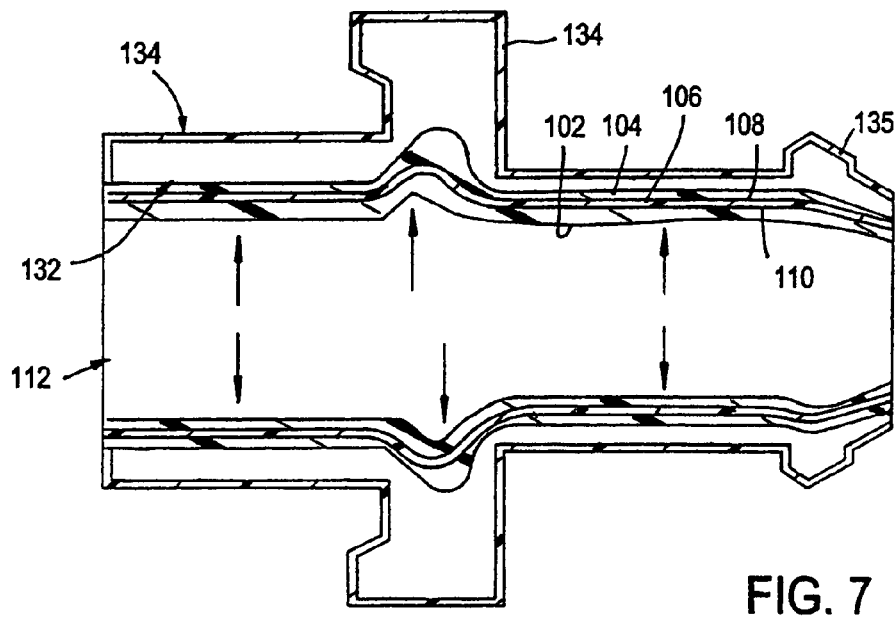
FIG. 7 is a sectional view as in FIG. 6 illustrating the parison partially expanded within the mold.

Referring in more detail to the drawings, FIG. 1 shows one presently preferred embodiment of a fuel tank 10 that has a shell 12 with an outer surface 14 and an inner surface 16 defining a cavity 18 for holding fuel. The shell 12 has a plurality of openings like opening 15 for receiving or providing access to components, for example and without limitation a fuel pump, pressure sensor, fuel level sensor, electrical connectors (all not shown), and an opening 20 for receiving fuel into the cavity 18. A fill nipple 22 is preferably attached to the outer surface 14 of the fuel tank 10 at a joint 25 and has a passage 24 aligned with the opening 20 so that fuel can pass through the passage 24 and into the cavity 18. The construction of the fill nipple 22 resists and preferably substantially prevents fuel vapor permeation therethrough to control and reduce evaporative emissions from the fuel tank 10. In addition, the joint 25 provides a secure attachment of the fill nipple 22 to the shell 12 and resists crack propagation or separation between the fill nipple 22 and the shell 12.

As shown in FIG. 3, the shell 12 of the fuel tank 10 has inner and outer layers of material 26, 28, respectively, separated by an intermediate layer of material 30. The intermediate layer 30 is preferably bonded to the inner and outer layers 26, 28 by a pair of adhesive layers 32 each disposed on an opposed side of the intermediate layer. The adhesive layers 32 provide a resilient bond between the intermediate layer 30 and the inner and outer layers 26, 28 to resist separation of the inner and outer layers 26, 28 from the intermediate layer 30. Preferably, the inner and outer layers 26, 28 are formed from a high-density polyethylene (HDPE), while the intermediate layer or barrier layer 30 is commonly formed from a material substantially impermeable to hydrocarbons, for example and without limitation, ethylene vinyl alcohol (EVOH). In the presently preferred embodiment, a layer of regrind material 33 is provided between the outer layer 28 and the adjacent adhesive layer 32.

As shown in FIG. 2, the fill nipple 22 has a body 34 with an outer surface 36 and an inner surface 38. The inner surface 38 defines the passage 24 extending between a pair of generally opposed ends 42, 44, with one end 44 constructed for attachment to the shell 12. Preferably, the end 44 includes in part a radially outwardly extending flange 46. The flange 46 presents at least a portion of the inner surface 38 for attachment to the shell 12.

As best shown in FIG. 4, the body 34 of the fill nipple 22 has an inner layer 48 of polymeric material and an outer layer 50 of polymeric material separated by an intermediate layer or barrier layer 52. Preferably, adhesive layers 54 bond the barrier layer 52 to both the inner and outer layers 48, 50. The inner and outer layers 48, 50 are preferably constructed from HDPE, while the intermediate layer 52 is preferably constructed from EVOH, and thus preferably has a similar laminate construction to that of the shell 12 of the fuel tank 10. The barrier layer 52 is substantially continuous throughout the body 34, and can be configured adjacent the ends 42, 44 to provide optimal sealing to limit the permeation of fuel vapors into the atmosphere. In the presently preferred embodiment, a layer of regrind material 55 is disposed between the outer layer 50 and adjacent adhesive layer 54.

The end 42 of the fill nipple 22 is preferably constructed to abut a fill pipe 56, and is commonly joined to the fill pipe 56 by a coupler, for example and without limitation, a low permeability rubber hose 58. Depending on the design requirements or necessities, the end 42 of the fill nipple 22 can have a variety of configurations. As such, it should be recognized that the orientation of the barrier layer 52 may take on differing configurations to best suit the individual design requirements. In the embodiment shown in FIG. 2, in addition to being configured to abut the fill pipe 56, the end 42 is configured to receive a snap-in inlet check valve assembly 60 that prevents fuel in the fuel tank 10 from escaping through the file nipple 22.

To form the fill nipple 22, a thermoform process is preferably used, and could be vacuum, blow or compression or hot forming molded, using the multi-layer wall construction preferably of HDPE, EVOH, adhesive and regrind layers discussed above. Forming the fill nipple 22 in this manner provides adhesion of the HDPE inner and outer layers 48, 50 to the EVOH barrier layer 52 through the adhesive layers 54. Therefore, the potential for permeation of fuel or fuel vapors through the multi-layer wall is greatly reduced.

In one forming process, an extruded multi-layer preform which may be any suitable shape including a generally flat sheet, preferably comprising the six layers of material previously discussed, is placed between two mold halves. With the parison placed between the two molds, the molds come together and form the parison to form the fill nipple 22. Upon bringing the two molds together, a parting line is formed, with the parting line preferably designed to expose the barrier layer 52 for trimming at specified locations at the ends 42, 44. It should be recognized that the fill nipple 22 can be trimmed while in the mold.

An alternate manufacturing process can be used that utilizes a vacuum to form the fill nipple 22. As shown in FIG. 5, a multi-layer sheet 70, preferably including the six-layers of material previously discussed, is formed between a male plug mold half 72 and a female mold half 74. The male mold half 72 includes a plug 76 that extends outwardly from a base 78 of the mold half 72 and is generally cylindrical in shape to form a generally cylindrical wall of the fill nipple 22. Preferably, an annular wall 80 extends from the base 78 surrounding and spaced from the plug 76. The annular wall 80 and the space between the annular wall 80 and the plug 76 facilitate taking up some of the sheet material as the sheet 70 is formed over the plug 76 to reduce or eliminate the formation of creases or wrinkles as the sheet 70 is formed over the plug 76.

The female mold half 74 is complementary shaped to the male mold half 72. The female mold half 74 includes a generally cylindrical cavity 82 adapted to receive the male plug 76 with a sheet 70 of material between them, and an annular cavity 84 which surrounds and is spaced from the cylindrical cavity 82 and is adapted to receive the wall 80 with the sheet 70 of material between them.

To form a fill nipple 22, a heated multi-layer sheet 70 is preformed on the male mold half 72 over the plug 76 by imparting a preforming vacuum between the sheet 70 and the male mold half 72. Thereafter, the female mold half 74 is disposed over the preformed sheet 70 and male mold half 72. When the female mold half 74 is fully received on the sheet 70 and male mold half 72, the preforming vacuum is turned off, and a finish vacuum is imparted between the female mold half 74 and the preformed sheet 70. For ease of forming, the temperature of the sheet 70 is preferably maintained between about 210° C.-230° C. Preferably, upon forming the fill nipple 22, a suitable minimum wall thickness of, for example, about 2-4 mm is maintained so that the fill nipple 22 has adequate strength to resist fracture in use. The fill nipple 22 is then trimmed from the formed sheet 70, and any scrap material is preferably saved for use in a regrind layer of a subsequent sheet 70, fuel tank or other fuel system component.

After forming the fill nipple 22, the fill nipple 22 can be attached to the outer surface 14 of the fuel tank 10. Preferably, hot plates are used to weld or bond the inner layer 48 of the flange 46 to the outer surface 14 of the shell 12. Generally, both the inner surface 38 of the fill nipple 22 and the outer surface 14 of the shell 12 are heated to about 200° C.-250° C. Upon heating the surfaces, the fill nipple 22, while having the passage 24 aligned with the opening 20 in the fuel tank 10, is pressed against the shell 12 of the fuel tank 10 to attach or bond the fill nipple 22 to the outer surface 14 of the shell 12. The heat applied to the outer surface 14 of the shell 12 and the inner surface 38 of the fill nipple 22 typically creates a melt zone extending into the outer surface 14 and inner surface 38 to a depth of about 1 to 1.5 mm.

With the fill nipple 22 attached to the shell 12, the check valve 60 and the fill pipe 56 are preferably assembled to the fill nipple 22. The coupler 58 preferably attaches the fill pipe 56 adjacent the end 42 of the fill nipple 22, and preferably a pair of hose clamps 62 are positioned to secure the coupler 58 to both the fill nipple 22 and the fill pipe 56, as is commonly known.

It should be recognized that the fuel tank 10 and fill nipple 22 may be constructed from different materials or compositions of materials, for example and without limitation, as shown in FIG. 2, the outer layer may include carbon black to facilitate welding a cover 66 to the outer surface 36 of the flange portion 46 and to the fuel tank 10. The carbon black facilitates the use of a through-transmission infrared (TTIR) welding process to join the cover 66 to the outer surface 36 of the fill nipple 22 and surface 28 of the fuel tank 10. The cover 66 can further prevent fuel vapor from entering the atmosphere. The cover 66 is preferably formed with a similar multi-layer construction including a vapor barrier layer. The cover 66 preferably overlies the weld zone between the fill nipple 22 and the fuel tank 10.

As shown in FIGS. 6-9, an alternate embodiment fill nipple 100 preferably is formed by blow molding and includes a vapor barrier layer. The fill nipple 100 preferably is formed from a coextruded multi-layer parison of the same general construction as the fill nipple 22 including inner and outer layers 102, 104 of polymeric material, an intermediate barrier layer 106 and one or more adhesive layers 108, 110 bonding the barrier layer 106 to the inner and outer layers 102, 104. Desirably, the fill nipple 100 can be constructed of the same material of a fuel tank to which the fill nipple 100 will be bonded, attached or otherwise coupled or connected. Desirably, the fill nipple 100 will then have the same swell and expansion characteristics, and may be readily welded or otherwise connected to the fuel tank. One or more of the layers, such as the inner and outer layers 102, 104 can be formed with a carbon filled polyethylene or similar material so that the fill nipple 100 is conductive to facilitate static discharge from the fuel tank. Additionally, the multi-layer coextruded construction of the fill nipple 100 provides desired bonding between adjacent layers and avoids separation between the layers or of the fill nipple to other assemblies, such as may occur in overmolded multi-layer components with insufficient adhesion or bonding between the layers of the component.

The fill nipple 100 includes a central, axially extending passage 112 and radially outwardly extending flange 114 to facilitate mounting the fill nipple 100 to the fuel tank. The flange 114 is preferably disposed between opposed ends 116, 118 of the fill nipple 100. One end 118 of the fill nipple is constructed and arranged to be disposed within the fuel tank at least in part, and may receive an inlet check valve assembly 120, as previously described. The other end 116 of the fill nipple 100 may extend at least partially out of the fuel tank and preferably includes one or more barbs 122, flanges or ribs adapted to receive a fill pipe or flexible hose through which fuel passes when fuel is being added to the fuel tank. The barbs 122 facilitate press fit or friction retention of an end of a hose disposed thereon, or may be threaded or otherwise configured to receive a quick connect fitting that couples a fill pipe to the fill nipple 100.

To improve the strength of the flange 114 and improve the resistance to hydrocarbon permeation therethrough, the flange 114 may be formed from a double thickness of material so that the flange includes two of each layer 102-110 of the fill nipple material. Desirably, this provides two vapor barrier layers 106 within the flange 14 and overlying the fuel tank when the fill nipple 100 is attached to the fuel tank. Desirably, the vapor barrier layer 106 is at least substantially continuous throughout the fill nipple 100 to improve the resistance to hydrocarbon permeation therethrough.

Figure 8:
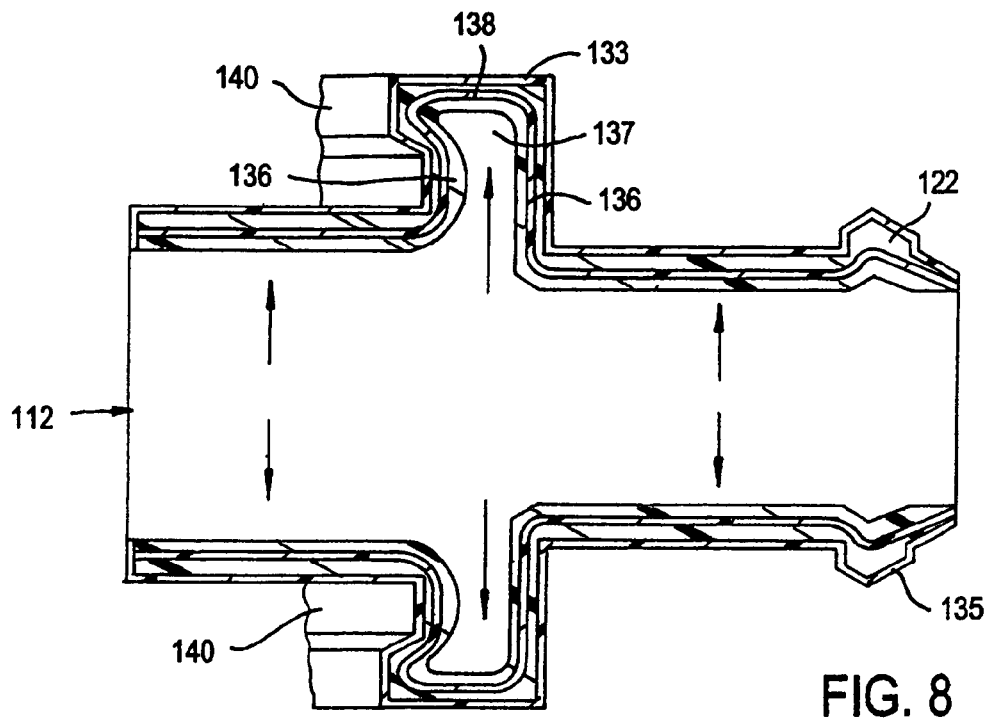
FIG. 8 is a sectional view as in FIG. 6 illustrating the parison more fully expanded within the mold.
Figure 9:
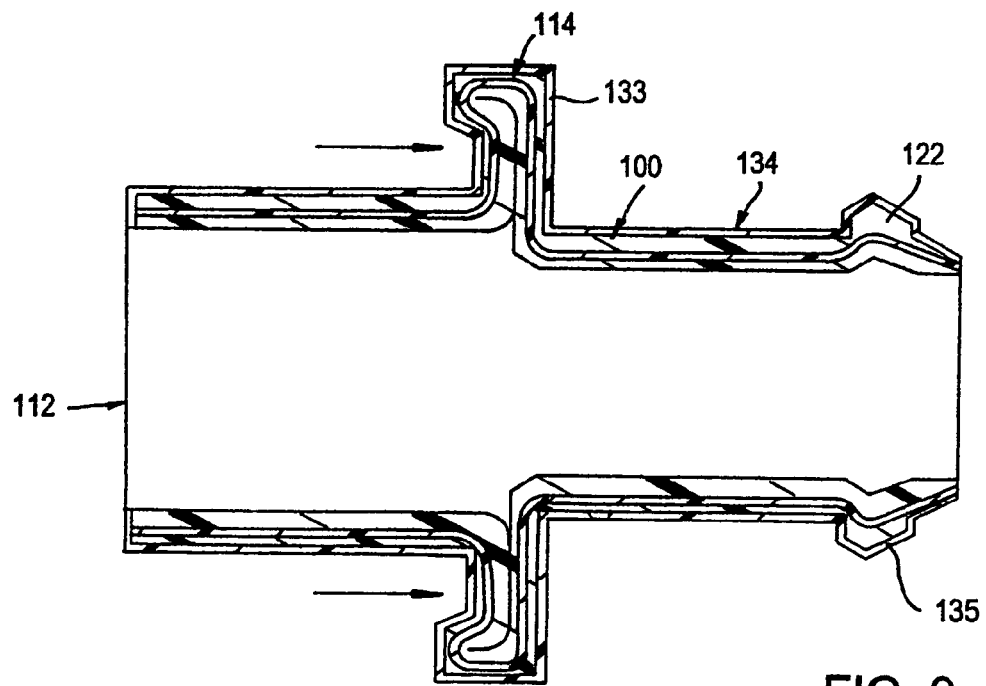
FIG. 9 is a sectional view of the parison and mold illustrating formation of a flange on the fill nipple.

To form the fill nipple 100, a coextruded generally cylindrical parison 130 is placed into a cavity 132 of a mold 134 and is thereafter expanded or blow molded to conform to the shape of the cavity 132. In the area of the flange 114 it may be desirable to have additional material or increased thickness of the parison 130 to provide sufficient material for the increased stretching or expanding of the material in that area of the mold cavity 132. Accordingly, it may be necessary to manipulate the parison 130 to provide additional material in the region where the flange 114 will be formed. In one presently preferred implementation, the parison 130 is inflated or blown into the shape of the mold cavity 132 as generally shown in FIGS. 8 and 9, wherein FIG. 8 shows an initial stage of the blow molding process and FIG. 9 shows the parison 130 generally completely expanded within the mold cavity 132. After the parison 130 is completely expanded within the mold cavity 132, an annular hollow or space is formed in the area where the flange 114 will be formed. In this region, the parison 130 has a pair of radially outwardly extending walls 136 interconnected by an axially extending portion 138 of the parison providing a generally U-shaped flange in cross section. Thereafter, one or more slides 140 carried by the mold 134 are moved to engage at least one of the walls 136 of the flange 114 and to compress the walls 136 of the flange 114 together. Thus, the flange 114 is formed from two wall portions of the parison 130 and has two of each layer of the parison 130 construction as previously described. The flange 114 may take on generally any size and shape as desired to facilitate attaching the fill nipple 100 to a fuel tank.

Figures 10, 11:
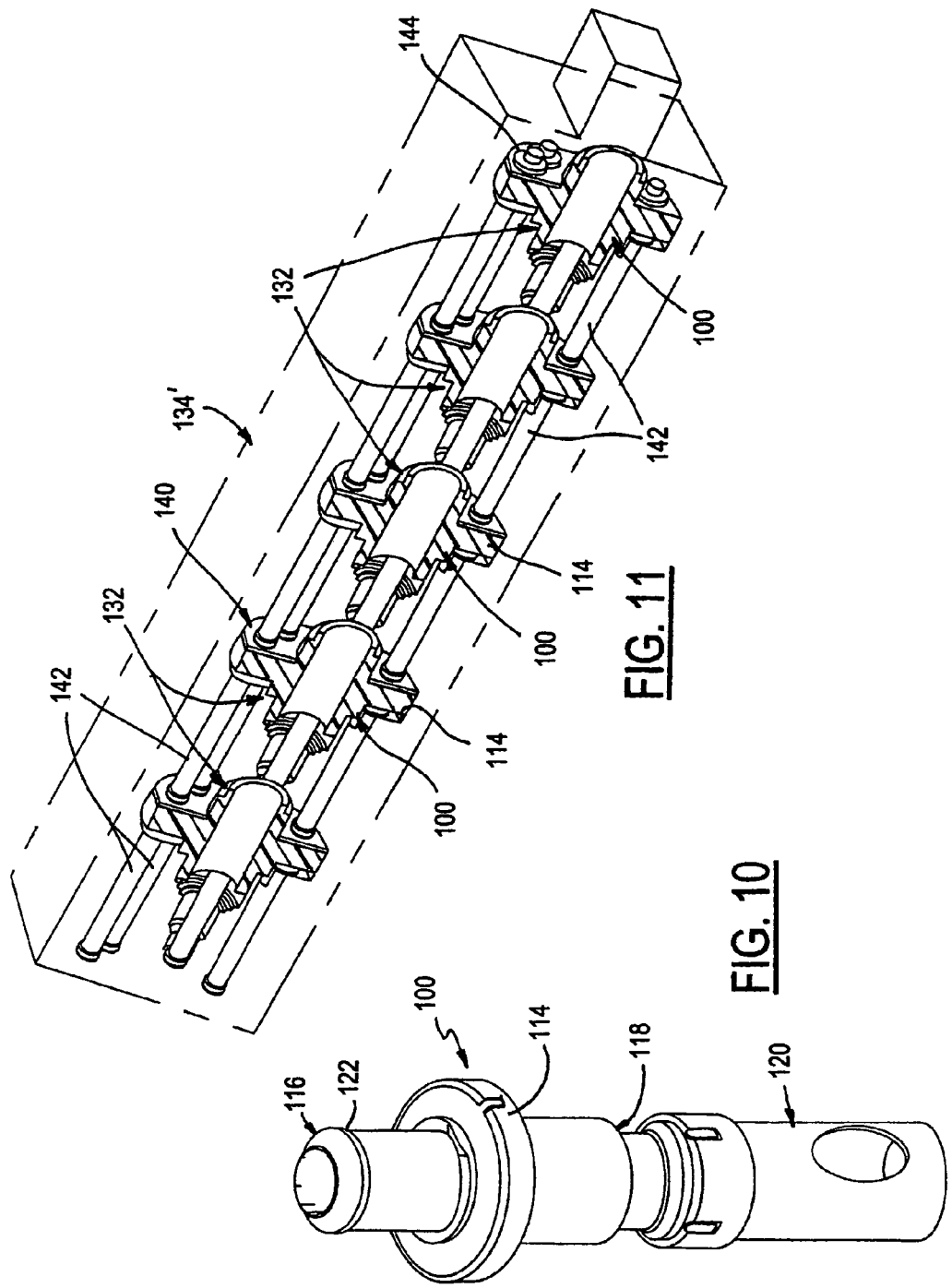
FIG. 10 is a perspective view of a fill nipple formed according to presently preferred aspects of the present invention and having a check valve assembly connected thereto.
FIG. 11 is a perspective view of one half of a mold used to form a plurality of fill nipples according to further presently preferred aspects of the present invention.

As best shown in FIG. 11, according to another presently preferred implementation, a plurality of fill nipples 100 may be formed simultaneously in a mold 134'. And this embodiment, the mold 134' includes a plurality of mold cavities 132 with each mold cavity 132 preferably axially aligned with adjacent mold cavities 132 so that a continuous or single elongated parison 130' can be disposed in the mold 134' with a portion of the parison 130' in each of the mold cavities 132. When the mold 134' is closed to blow mold the parison 130, the parison 130 may be separated generally between each of the mold cavities 132, or parison 130 may be separated into discrete sections prior to closing the mold 134', or formed fill nipples 100 may be initially interconnected and separated after the blow molding process, as desired. Guide rods 142 may be provided in the mold to guide and control the movement of the slides 140 for each mold cavity 132. The slides 40 may be individually actuated, or linked together for simultaneous movement, as desired, to form the flange 114 of each fill nipple 100 as previously described. The slides 140 may include generally U-shaped heads 144 each coupled to a rod 142 and arranged to selectively engage one-half of the circumference of a flange 114. One U-shaped head 144 may be disposed on one side of the flange 114 in each cavity 132 so that when the slides 140 are moved the heads 144 engage their respective flanges 114 and compress them against an opposed mold section.

Many modifications and variations of the present invention will be apparent to those of ordinary skill in the art. It is, therefore, to be understood that within the scope of the appended claims, the invention may be practiced otherwise than as specifically described. The invention is defined by the claims that follow.

We claim:

1. A method of forming a fill nipple for a polymeric fuel tank, comprising the steps of:
   providing a mold having at least one mold cavity with a shape adapted to define the desired shape of the fill nipple including a side wall and an outwardly extending section to define an outwardly extending flange on the fill nipple and at least one slide of the outwardly extending section movable relative to the mold cavity;

disposing in the mold cavity a cylindrical parison having a wall having an inner layer of a polymeric material through which hydrocarbons can permeate, an outer layer of an HDPE polymeric material and a substantially continuous hydrocarbon vapor barrier layer of a polymeric material between and adhered to the inner and outer layers of material, the polymeric material of the vapor barrier layer having a different composition than the polymeric material of the inner and outer layers;

expanding the parison within the mold cavity so that the parison wall conforms to the contour of the mold cavity such that the parison includes a side wall portion and a pair of spaced outwardly extending wall portions in the outwardly extending section of the mold cavity; and moving the slide relative to the mold cavity to compress and form the outwardly extending wall portions into a flange section of the fill nipple wherein the flange section includes two vapor barrier layers within the flange section and continuous with the vapor barrier layer in the side wall of the fill nipple.

2. The method of claim 1 wherein the parison is formed from a plurality of layers of material and each of the pair of outwardly extending walls includes each of said plurality of layers of material.

3. The method of claim 1 wherein said mold includes a plurality of mold cavities and said disposing step includes disposing said parison at least partially in each mold cavity to form a plurality of fill nipples.

4. The method of claim 3 wherein at least one slide is associated with the outwardly extending section of each mold cavity and said moving step includes moving each slide relative to its associated mold cavity to form a flange on the fill nipple.

5. The method of claim 3 which also includes the step of severing the material used to form the fill nipples to provide a plurality of separate fill nipples.

6. The method of claim 5 wherein said severing step is accomplished prior to said expanding step.

7. The method of claim 5 wherein said severing step is accomplished after said expanding step.

8. The method of claim 5 wherein said severing step is accomplished after said moving step.

9. The method of claim 1 wherein said expanding step is accomplished with fluid under pressure.

10. The method of claim 9 wherein said expanding step includes blow molding the parison.

11. The method of claim 3 wherein said plurality of mold cavities are axially arranged and said parison is a single continuous parison which extends into each mold cavity.

12. The method of claim 11 wherein said at least one slide includes at least one slide associated with the outwardly extending section of each mold cavity with the slides being linked together.

13. A method of forming a fill nipple, comprising the steps of:

providing a mold having at least three mold cavities each with a shape adapted to define the desired shape of a fill nipple including an outwardly extending section to define an outwardly extending flange on the fill nipple and each with at least one slide of the outwardly extending section movable relative to the its associated mold cavity;

disposing a cylindrical parison with a circumferentially continuous wall in each mold cavity;

expanding the parison within each mold cavity so that the parison wall conforms to the contour of the mold cavities with two wall portions in each outwardly extending section of each mold cavity; and moving each slide relative to its respective mold cavity to compress together the two wall portions of the expanded parison in the outwardly extending section to form a flange section of the fill nipple in each mold cavity.

14. The method of claim 13 wherein said mold cavities are axially arranged and said parison is a single continuous parison which extends into each mold cavity.

15. A method of forming a fill nipple for a polymeric fuel tank, comprising the steps of:

providing a blow mold having at least two axially aligned adjacent mold cavities each with a shaped configured to define the desired shape of a fill nipple including an outwardly extending section to define an outwardly extending flange of the fill nipple;

at least one slide associated with the outwardly extending section of each mold cavity and movable relative to its associated mold cavity;

disposing a single continuous cylindrical parison having a wall having an inner layer of a polymeric material, an outer layer of a polymeric material and a substantially continuous vapor barrier layer of a polymeric material substantially impermeable to hydrocarbons between and adhered to the inner and outer layers of material with the polymeric material of the vapor barrier layer having a different composition than the polymeric material of the inner and outer layers and with a portion of the parison in each of the mold cavities;

expanding the parison in each mold cavity by blow molding so that the parison wall conforms at least in part to the contour of each of the mold cavities including the outwardly extending section; and moving each slide relative to its respective mold cavity to compress two portions of the wall of the parison in the outwardly extending section to form a flange section of the fill nipple in each mold cavity wherein each flange section includes two vapor barrier layers within such flange section and continuous with the vapor barrier layer in the wall portion of the fill nipple in the mold cavity.

* * * * *